United States Patent [19]
Vinsani

[11] 3,882,386
[45] May 6, 1975

[54] DEVICE FOR TESTING OPERATION OF INTEGRATED CIRCUITAL UNITS

[75] Inventor: Mario Vinsani, Milan, Italy

[73] Assignee: Honeywell Information Systems Italia, Caluso, Italy

[22] Filed: Mar. 10, 1972

[21] Appl. No.: 233,675

[30] Foreign Application Priority Data
June 9, 1971  Italy .................................. 25624/71

[52] U.S. Cl. ............................................. 324/73 R
[51] Int. Cl. ............................................ G01r 15/12
[58] Field of Search ............ 324/73 R, 73 AT, 158; 235/153 AE

[56] References Cited
UNITED STATES PATENTS
| | | | |
|---|---|---|---|
| 3,286,175 | 11/1966 | Gerbier ................................ | 324/73 |
| 3,614,608 | 10/1971 | Giedd .................................. | 324/73 |
| 3,624,372 | 11/1971 | Philip .......................... | 235/153 AE |

OTHER PUBLICATIONS
De-Bugger Tests IC's In Circuit – Electronics – Sept. 15, 1969 – pp. 172, 173.
Y. Tsusboi – Function Tester For Digital Integrated Circuits – Elect. Engineering in Japan – 89(8) – 1969 – pp. 45–54.

Primary Examiner—Alfred E. Smith
Assistant Examiner—Rolf Hille
Attorney, Agent, or Firm—Fred Jacob

[57] ABSTRACT

A device for testing integrated circuit units is provided having means for connecting to the unit under test and for comparing the out-going signals of the unit with the outgoing signal of a reference unit in a manner to detect a difference in the logic operation of the unit under test with respect to the reference unit to detect failures. A timing circuit prevents emission of a failure signal due to differences in output caused by differences in signal propagation delay times between the unit under test and the reference unit.

17 Claims, 18 Drawing Figures

DEVICE FOR TESTING OPERATION OF INTEGRATED CIRCUITAL UNITS

BACKGROUND OF THE INVENTION

The present invention relates to a device for testing integrated circuit units of the type used in electronic apparatus for digital data processing.

Many devices and processes, known under the general name of diagnostic means, are intended to detect failures in electronic data processing apparatus, and to identify the discrete component or the integrated unit which has failed. Such means may be roughly divided into three groups.

A first group of diagnostic means makes exclusive use of diagnostic procedures or programs: that is, the data processing apparatus is controlled by a suitable program, and the behavior of the apparatus, its reactions and the obtained results produce a set of symptoms, that is of indications, suitable for identifying the nature and the location of the possible faults.

A second group of diagnostic means makes exclusive use of diagnostic hardware: for instance, of redundant devices. Each part of the apparatus providing a logical elementary function, that is each logical element, is duplicated and the logical, or more generally, the electrical behavior of both logical elements is compared by suitable electrical circuits which signal a failure in case of discrepancy between their behaviors. It may easily be understood that this group of diagnostic means is very expensive, requiring a substantial duplication of the whole apparatus.

A third group of diagnostic means, usually preferred, makes use of diagnostic programs in connection with suitable redundant checking circuitry, which permits a speed up of the diagnostic procedure.

Whatever the nature of the available diagnostic means, a very important factor is their degree of diagnostic resolution, that is, the capability of identifying either the single faulty unit, or a restricted group of units, as being responsible for the detected failure.

The final object of the identification of the faulty unit is its substitution to eliminate the failure. It is therefore clear that an ideal diagnostic means should have such a degree of diagnostic resolution as to identify the origin of the fault at the level of the minimal replaceable unit. According to the modern trend, such minimal replaceable unit is an integrated circuital unit, that is the set of circuits contained in a single package.

The integrated units are soldered to printed circuit boards, providing the required connections between integrated units carried by the same board. The boards have pin connectors for the external connection and are plugged into plug connectors, whose plugs are appropriately interconnected to form the back-panel wiring.

In general, it is possible to localize the single faulty integrated unit, but the achievement of this object requires a waste of time, an out-lay of programming activity, or a quantity of redundant devices which are usually burdensome.

On the other hand, it is much easier to localize the fault in the set of the integrated units mounted on a single, or on a few, printed circuit boards, thus removing the fault by substituting one or few such boards.

However, as the number of integrated circuital units carried by a single board is, in modern apparatus, very high (up to forty and more) the substitution of the whole board is too expensive, and cannot be practically accomplished at the location where the apparatus is installed, as this would require that the maintenance operation be provided with a specimen of all boards existing in the apparatus.

It is therefore convenient to choose an intermediate way and go forward with the diagnostic procedure to the point of localizing the fault between a relatively restricted number of circuital units; for instance, about ten of these units. This is convenient if a second stage of diagnostic means is available, for rapidly identifying the circuital unit which is actually faulty among those forming the group in which the fault has been located.

It is therefore an object of the present invention to provide a diagnostic device, to be used preferably in connection with diagnostic programs of known type, having a resolution degree capable of localizing a fault in a group formed by a limited number of integrated units, this device being capable of identifying the effectively faulty integrated unit among those pertaining to the group where the fault has been localized.

In particular, the invention provides what may be called a means of redundance and comparison, which is not part of the data processing equipment, but may be applied to the same, in correspondence to those portions of the equipment which are presumed to be faulty, to verify whether its behavior is a correct or a defective one.

Such a redundancy and comparison device has the advantage, with respect to the redundant circuits usually provided as part of the electronic apparatus, that its correct and fault-free behavior may be checked before its operation, or at regular intervals, in a very simple manner. Thus, the risk that the comparison circuit be faulty is eliminated, and it is possible to remove the uncertainty, ever present with the conventional redundant circuits, as to which one of the two circuits carrying on the same function, the fault must be ascribed.

SUMMARY OF THE INVENTION

These objects are achieved according to the invention, by a testing device provided with means for connecting the input pins of an integrated circuit unit under test to the input pins of a reference integrated circuital unit, and for comparing the outgoing signal delivered at the output pins of the unit under test with the outgoing signals of the reference unit, such a way, as to detect any difference in the logic operation of the unit under test with respect to the reference unit, and, therefore, to detect any failure of the unit under test. A suitable timing circuit prevents the emission of a failure signal which could be due to the difference of the output values, caused by admissible differences in the signal propagation delay times of the unit under test and of the reference unit.

The electrical stimulation of the integrated unit which is presumed to be defective, and of the reference unit, is obtained by operating the data processing apparatus in such a way as to effectively test the operation of the unit according to a suitable diagnostic program.

Such programs are different for different apparatus, and are well known to anyone skilled in the art; it is therefore unnecessary to go into more detail on the subject for the purpose of the present invention.

According to a particular embodiment of the invention, the device also comprises circuital means allowing one to check whether the values of the input and output voltages of the unit under test are within the allowed limits.

It may occur, in fact, that by chance the voltages corresponding to the logical levels of the unit under test, applied to its inputs or present at its outputs, are no longer within the allowed limits, but are so degraded as to jeopardize, even if occasionally, the operation of the whole apparatus. The simple logical check of the unit under test, as above indicated, may not detect this malfunctioning, because as the same degraded voltages are applied to the reference unit, it may happen that this unit responds in the same faulty manner as the unit under test.

Naming $V''_s$ the minimum admissible value for the voltage corresponding to the logic level associated to the upper voltage level, and $V'_s$ the maximum admissible value for the voltage corresponding to the logic level associated to the lower voltage value, the units having at their inputs and outputs voltage values comprised between $V'_s$ and $V''_s$ will be signalled as malfunctioning.

According to said embodiment, the device may also be modified in order to be suitable for checking the behavior of circuital units of the analog type, and its use is therefore possible and convenient for devices of the analog or analog-digital type.

The test device according to the invention is provided with switching means to permit the mounting of different integrated units pertaining to the same circuital standard used in the apparatus under test, and in addition, a multiple-contact gripper which may be easily applied to the unit under test, and permits easy movement from one unit to another. It is therefore possible to rapidly submit a sufficient number of integrated circuital units to the checking process during the operation of the apparatus and identify the malfunctioning one.

BRIEF DESCRIPTION OF THE DRAWINGS

A preferred embodiment of the invention is now described in detail, with reference to the attached drawings, in which.

DESCRIPTION OF THE PREFERRED EMBODIMENT

In the preferred embodiment described hereafter, the logic applied is that called Transistor-Transistor-Logic, or more briefly TTL; integrated circuit units operating according to this logic are available on the market and are largely employed in the technique. According to the standards followed in the described example, the integrated circuit units are fed by a positive voltage of approximately + 5 V with respect to a common reference voltage (ground). The logic level ONE corresponds to a nominal voltage of + 3.5 V with respect to ground, and the logical level ZERO corresponds to the ground voltage (O V). The minimal voltage admitted for the ONE level is, for instance 2.8 V, and the maximum voltage allowed for the ZERO level is 0.4 V.

Figures 1, 1A:
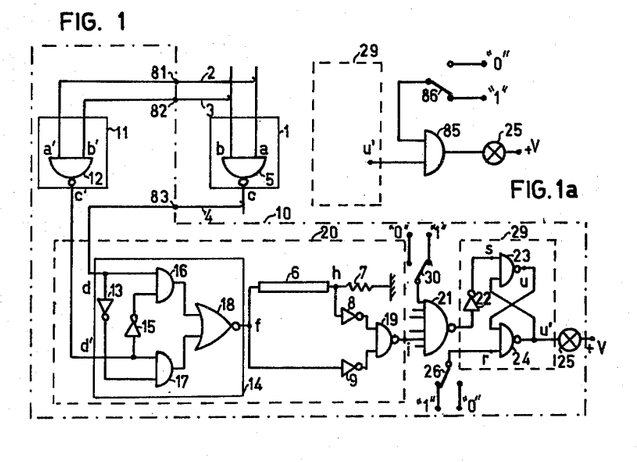
FIG. 1 is a logic diagram of a simplified form of the invention, related to the logic testing.
FIG. 1a is a variant to the diagram of FIG. 1.

To better explain the basic idea of the invention, FIG. 1 illustrates a very simplified case of a logical test circuit.

Reference numeral 1 indicates an integrated circuit unit comprising, besides other elementary gates or circuits, a NAND gate 5 with two inputs $a$ and $b$ and an output $c$. As known, a NAND gate is an elementary logical circuit providing the logic NAND function: that is, the output $c$ is at ZERO level if, and only if, both the inputs $a$ and $b$ are at level ONE.

Reference numeral 10 indicates the diagram of the testing device, as a whole, enclosed in the dot-and-dash line. It comprises, as will be better explained hereafter, an integrated circuit unit 11 comprising a NAND gate 12, which is known to be correctly operating, and is employed as reference circuit. This gate has two inputs $a'$ and $b'$, and an output lead $c'$. By means of a gripping member, already known in the art three leads 2, 3, and 4, connected to three terminals 81, 82 and 83 of the testing device, are put in contact respectively with the input leads a and b, and with the output lead c of the NAND gate 5. The leads 2 and 3 are connected through terminals 81 and 82 to the input leads $a'$ and $b'$ of NAND gate 12. The lead 4 is connected through the terminal 83 to an input lead $d$ of a comparator circuit 14 having two input leads, the remaining input lead $d'$ connected to the output $c'$ of the NAND gate 12.

The comparator circuit has an output lead f on which a value ONE is present if, and only if, inputs $d$ and $d'$ have the same logic level. Such a circuit may be obtained by many known means, according to the technology and to the logic used. By integrated circuit technology, and in particular, by TTL logic, this function may be obtained by two inverters 13 and 15 and an integrated circuit unit providing the logic functions AND-OR-NOT, having four inputs, and comprising the two AND gates 16 and 17, and the NOR gate 18.

By applying the Boolean variables d and d' to the input leads so designated, the output lead f gives out the variable $f = d\,d' + \bar{d}\,\bar{d}'$, which has a value ONE if $d = d'$, or a value ZERO if $d \neq d'$.

It is therefore clear that if the NAND gate 5 under test operates exactly in the same way as the reference NAND gate 12, at the output lead $f$ there will constantly be a level ONE, whereas, if NAND gate 5 is faulty, and gives at its output a logic level different than the correct one which is delivered by reference gate 12, the output lead f will be at the level ZERO.

However, each gate has its own propagation delay time for the signal, and these delays, although comprised in predetermined limits, are usually different for each gate. Therefore, within strictly fixed limits, the delay time of the circuit under test is usually different from the delay time of the reference circuit. Even in the case where the level changes are applied exactly at the same time to the inputs of the circuit under test and to the inputs of the reference circuit, the corresponding level changes at the outputs, of the two gates will not occur exactly at the same time.

Therefore, even in case of correct operation of the tested gate, there may appear at the output of the comparator, short spikes of ZERO level, which should not be considered as a fault signal.

These spikes will always be very short if compared to the duration of the signals applied to the inputs of the circuits, and are therefore, easy to discriminate from the effective fault signals. According to the preferred embodiment, this may be accomplished by a delay line 6, closed on its own characteristic impedance 7, which introduces a predetermined delay in the propagation of a pulse applied to its input.

The input and the output of the line are connected, through two inverters 8 and 9, to the inputs of a NAND gate 19.

Figure 2:
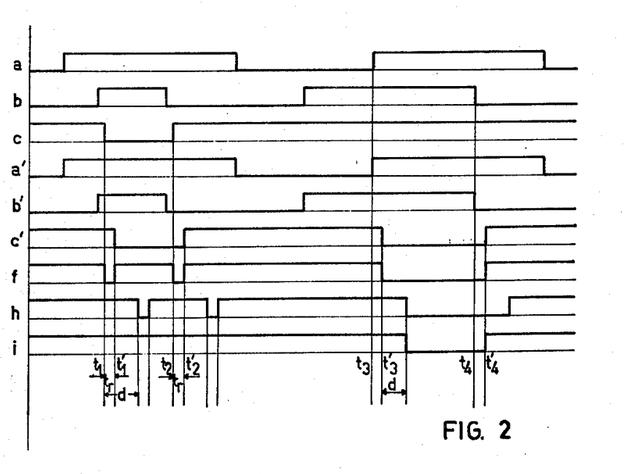
FIG. 2 shows the time diagrams of the logic levels at different points of the diagram of FIG. 1.

FIG. 2 shows the time diagrams of the logic level variations of the values present at the points indicated in FIG. 1 by the same lower case letters which are indicated in the time diagrams.

The logic level variations at the inputs $a$ and $b$ of the NAND gate under test take place at the same time as the logic level changes at inputs $a'$ and $b'$ of the reference NAND gate, whereas, the corresponding level variations at the output c of NAND gate 5, happening at times $t_1$ and $t_2$ do not take place at the same time as the corresponding level changes to the output $c'$ of NAND gate 12, at times $t'_1$ and $t'_2$, as each one of these variations is separated from the preceding one by an interval $t_r$. Therefore, spikes of level ZERO and duration $t_r$ are generated at the output $f$ of the comparator 14. These spikes are applied to the input of the delay line $f$ and appear, after an interval $d$, at the output $h$ of the same, $d$ being the delay introduced by the delay line. If the duration $t_r$ of these pulses of level ZERO is lower than the delay $d$ of the delay line, there will never be coincidence of ZERO levels at the inputs of the inverters 8 and 9, and therefore neither will there be coincidence of ONE levels at the inputs of NAND gate 19. The output $i$ of NAND gate 19 will be constantly at the level ONE.

Assuming on the other hand, that in the unit under test the input a is faulty, so that, at time $t_3$, the input b being a level ONE, and also the input a going to a level ONE, the output c remains at the ONE level instead of going down to the ZERO level.

The output of the reference unit $c'$, on the contrary, will go to ZERO level at time $t'_3$; therefore the levels applied to the inputs $d$ and $d'$ will be different as long as the level ONE is applied to all four inputs $a, b, a', b'$.

Referring to the time diagrams, it will be seen that this condition will last at least up to the time $t'_4$, that is for a duration substantially longer than $t_r$. The ZERO going front delivered by the output of the comparator at time $t'_3$, which is applied to the input $f$ of the delay line, after a delay $d$ reaches its output $h$. From this time on there will be coincidence of level ZERO to the inputs of the inverters 8 and 9, and therefore a ZERO level at the output $i$ of NAND gate 19.

As will be better described hereafter, the circuit comprising the comparator 14, the delay line 16 closed on the impedance 7, the inverters 8 and 9 and the NAND gate 19 form a "logic test channel" which may test the logic operation of an elementary gate contained in the integrated circuit unit and having an output lead.

The logic test channel, enclosed by the dashed line in FIG. 1, is indicated as a whole by reference numeral 20. Conveniently, the test device according to the invention will comprise a plurality of said channels, one for each of the output leads which the device is able to test at one time. Therefore the output lead $i$ of NAND gate 19 is one of the inputs to NAND gate 21, having other inputs corresponding to the outputs of as many test channels. The output of NAND gate 21 will be ONE if at least one of the inputs is at ZERO level, that is, if at least one of the test channels is signalling a fault. The output level of NAND gate 21, inverted by inverter 22, is applied to the input of a bistable circuit, or flip-flop, comprising two NAND gates 23 and 24 interconnected as indicated in the drawings. The circuit enclosed by the dashed line and comprising the flip-flop, the inverter 22, and indicated by reference numeral 29, is a flip-flop having a SET signal of the value ONE, and a RESET signal of the value ZERO. In the "down" condition, with input $s$ at ONE, there is a ZERO value at the output u of NAND gate 23 and a ONE value at the output $u'$ of NAND gate 24. When a value of ZERO is applied at input $s$, the flip-flop goes to the "up" condition, the output u being ONE and the output $u'$ being ZERO.

This condition of the output $u'$, corresponding practically to a ground voltage, causes the lighting of a signalling device, 25, which is preferably a solid state photo-emitter connected between said output $u'$ and a positive voltage source $+ V$. If the contact 26 of a push button is switched on, which, in the "down" condition applies a level 1, a level ZERO may be applied to the RESET input lead r, returning the flip-flop to the rest condition and turning off the signal light.

An additional input lead to NAND gate 21, connected to a hand-operated push-button contact 30, permits application of a binary level ZERO to the NAND gate 21, thus setting the flip-flop 29 in the "up" condition and causing the lamp 25 to light up. Thus, the presence of the feeding voltage and the correct operation of the signalling device may be tested. The same test may be carried out by the alternative circuit shown in FIG. 1a, whereby the output $u'$ of flip-flop 29 is connected to a first input lead of AND gate 85 which has a second input lead connected to a contact 86 of a push-button. The push-button contact 86, in the rest condition, applies a binary signal ONE to the said second input lead. In this case, the flip-flop 29 being in the "down" condition, there is a binary level ONE at the output of the AND gate 85 and the light signalling device, being connected across said output lead and the voltage source, is off. By pushing the button, the contact 86 is switched on, and a binary level ZERO is applied to the second input lead of the AND gate 85 so that the output goes to level ZERO and the lamp lights up. It is thus possible to test the operation of the signalling device, and the presence of the feeding voltage without operating the flip-flop. This alternative circuit replaces, of course, the push button 30 and the related additional input to the NAND gate 21.

Figure 3:
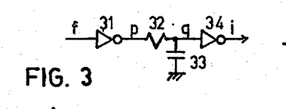
FIGS. 3, 3a and 3b show respectively a possible variant of the timing circuit, the related time diagrams and an improvement of said variant.

Another possible way of avoiding the detection of the spikes is the one schematically illustrated in FIG. 3. It comprises an inverter 31, a resistor 32, a capacitor 33 and a second inverter 34, connected as shown. The input of inverter 31 is coincident with the output lead *f* of the comparator 14, and the output lead of inverter 34 is coincident with one of the inputs *i* to the NAND gate 19.

The time constant of the integrating circuit formed by resistor 32 and capacitor 33 is large in respect to the maximal duration of the spikes which, through inverter 31 are applied to the resistor 32 as positive pulses.

Figure 3A:
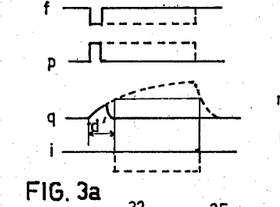
Figures 3B, 6:
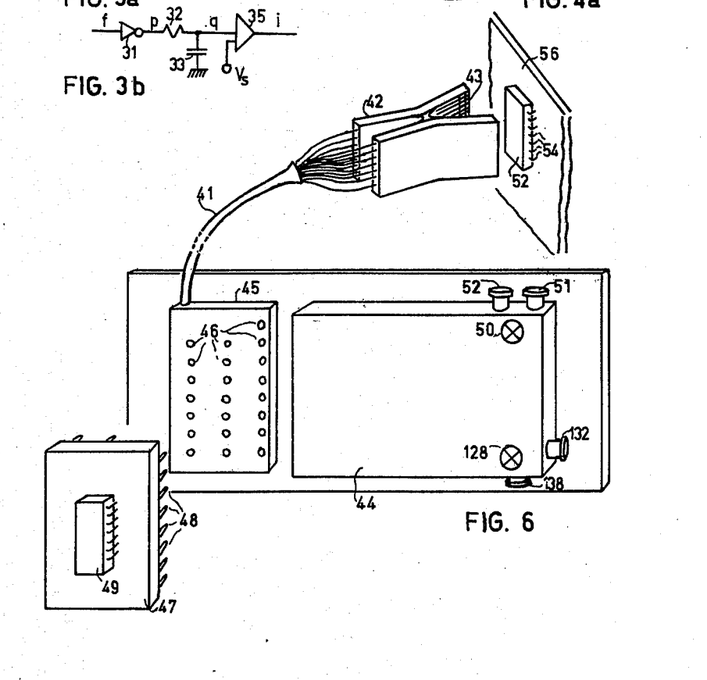
FIG. 6 is the schematic perspective illustration of a possible form of construction of the device.

As shown by FIG. 3a, comprising the time diagrams of the voltages at the points of the circuit corresponding to the indicated letters, only in the case where the duration of the spike coming from the comparator circuit is larger then a predetermined value $d'$, the voltage of point $q$ may become higher than a predetermined threshold level $V_s$ which may advantageously be selected equal to the switching threshold of inverter 34. Only in this case will the output *i* go to a level ZERO. A more accurate and flexible method of setting the threshold level is shown in FIG. 3b, which differs from FIG. 3 only by the fact that the point *a*, instead of being connected to the input of inverter 34, is connected to one of the inputs of a differential amplifier 35, whose other input has a voltage equal to the threshold value $V_s$ applied thereto. The circuit is so arranged, that a logic level ZERO is present at the output *i* only in the case that the voltage to the input $q$ is higher than the threshold value $V_s$. It is therefore, easy to set the threshold voltage exactly at the desired value, and to change it according to needs.

Figure 4:
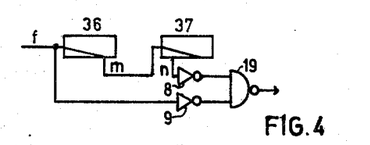
FIGS. 4 and 4a show respectively a second possible variant of the timing circuit, and the related time diagrams.
Figure 4A:
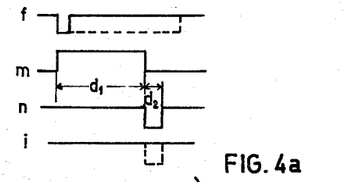

Another possible way of obtaining the same result is to effect a sampling of the output signals of the comparator circuit at properly delayed time intervals. FIG. 4 shows the logic diagram of the device and FIG. 4a the time diagrams related to the same.

The output lead f of the comparator circuit 14 is connected to the input lead of a first monostable circuit 35, so arranged, that when a ZERO going front is applied to its input, its output *m* goes over to a ONE binary level, remaining in this condition for a predetermined time $d_1$. The output *m* is connected to the input lead of a second monostable circuit 37, so arranged that the ZERO going front applied to the same at the end of said duration $d_1$ causes a ZERO level pulse of predetermined duration $d_2$ at the output *n*. The input lead *f* to the monostable circuit 36 and the output *n* of the monostable circuit 37 are each applied to an input respectively of inverters 8 and 9, connected to the NAND gate 19 as shown in FIGS. 1 and 4.

It may be seen that, only in the case where the duration of the ZERO pulse coming from the comparator circuit is larger than the time interval $d_1$, there is coincidence of ZERO values at the inputs of the inverters 8 and 9, and therefore, a ZERO level at the output of the NAND gate 19.

Figure 5:
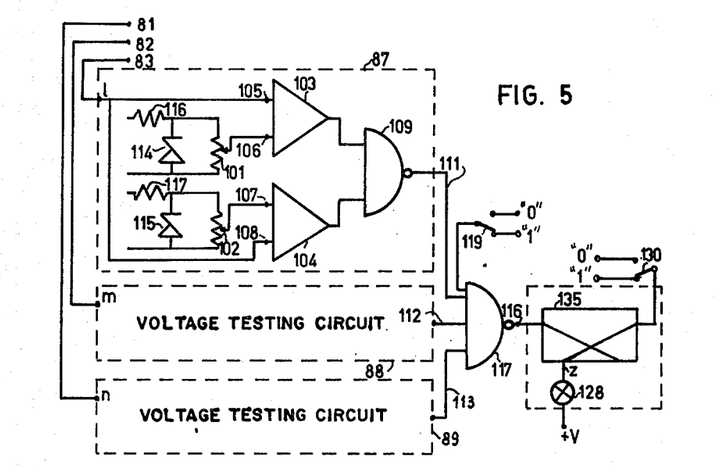
FIG. 5 shows the logic diagram of the device for voltage testing.

In a particular embodiment of the invention as described, another circuit is added to the logical level comparing circuit for checking the voltage level at the input and output leads of the integrated unit under test. This circuit is schematically represented in FIG. 5.

The inputs and the output of the NAND gate under test are connected, through terminals 81, 82 and 83 of FIG. 1 and FIG. 4 to the input 1', m', n', of three voltage testing circuits, indicated respectively, as a whole, by reference numerals 87, 88 and 89, and designed for comparing the voltages present on said inputs with two threshold voltages values, in such a way that if the voltage under test has a value comprised between said two threshold voltages, a ZERO level is present at the output of the circuit and in the contrary case, there is a ONE level.

These voltage testing circuits may be made in different ways. In FIG. 5 according to the preferred embodiment, only the diagram of the device for the testing of circuit 87 is shown, as the circuit 88 and 89 are similarly formed. It comprises two differential amplifiers indicated by the reference numerals 103 and 104, and two voltage dividers indicated by numerals 101 and 102. The first one of these voltage dividers 101 is stabilized by means of the Zener diode 114 and resistor 116, and the second one by the Zener diode 115 and resistor 117. The voltage under test and the output voltage of divider 101 are applied respectively to inputs 105 and 106 of the differential amplifier 103. Similarly, the voltage under test and the output voltage of divider 102 are applied to the inputs 108 and 107 of the differential amplifier 104.

The device comprises in addition a NAND gate 109 whose inputs are connected to the outputs of the differential amplifiers 103, 104 and a feeding voltage supply, not shown, for feeding the differential amplifiers. The differential amplifiers 103, 104 are devices widely known in the art, and therefore do not need to be described in detail. It is sufficient to indicate that the differential amplifier 103 is so adjusted that it delivers a signal of binary level ONE at the output if the voltage to input 105 is lower than the voltage applied to input 106. On the other hand, the differential amplifier 104 is so adjusted that it delivers a binary level ONE at the output if the voltage applied to input 108 is higher than the voltage applied to input 107. It is assumed that the output voltage levels of the two voltage dividers 101, 102, applied to inputs 106 and 107, are so chosen that the voltage of input 107 is lower than the voltage of input 106. Therefore, only if the voltage applied to inputs 105 and 108 of the differential amplifiers is comprised between the output voltage values of the dividers, are there level ONE signals at both inputs of the NAND gate 109 and therefore a ZERO signal at its output. The voltage values at the outputs of the dividers 101, 102 are chosen in accordance to the systems standards of the circuit. In the instance of standard TTL logic as in the example, the output of divider 102 is set at the maximum admitted value for the ZERO signal, that is approximately 0.4 V whereas the output of divider 101 is set for the minimum admitted value for logical level ONE, that is approximately 2.8 V.

Other voltage testing circuits, differently constructed, may be applied, all of them being characterized by the use of two separated logic devices having different response thresholds, the voltage under test being applied to the input of both devices, in such a way as to have a first pattern of binary values at the output of the devices in correlation to the circumstance that the voltage under test is comprised between the above said threshold values, and at least a second binary value pattern if the voltage under test is lower than the lower threshold value or higher than the higher threshold value.

These binary level patterns are applied to the inputs of a binary output circuit, such as to give, for instance, a ZERO level corresponding to the first one of said patterns, and a ONE level corresponding to the remaining patterns.

The outputs 111, 112 and 113 of the three voltage testing circuits 87, 88, 89 are connected to the inputs of a NAND gate 117, whose output 116 will be at a binary level ONE if at least one of its inputs is at level ZERO. The output of the NAND gate 117 is applied to the SET input, of a bistable (flip-flop) circuit 135 wholly similar to the flip-flip 29 of FIG. 1, above described.

In the rest condition the SET input of this flip-flop is at the level ZERO, and at its output Z there is a signal at level ONE. When a level ONE is applied at the SET input, the output Z goes to level ZERO, and the light signalling device, indicated by reference numeral 128, lights up. The flip-flop may then be reset by means of the contact 130 of the reset push-button. The operating condition of the light signalling device may be tested by a push-button having a contact 119 connected to an auxiliary input of the NAND gate 117, as already explained with reference to FIG. 1, or by a device identical to the one shown in FIG. 1a.

As the device according to the invention must be able to test the operation of a number of different types of integrated circuit units, means must be provided to adapt the device by an easy and swift maneuver, to the different types of circuit units which are comprised in a same circuit system.

According to a preferred embodiment, such requirement is met by the fact that the device consists of two parts which may be physically connected or disconnected. A first part is formed by a test panel of general use for a predetermined circuit system, and comprises the comparators and the error signalling circuits. The second part, of specific use for each type of circuit unit of said system, is an adapter device comprising an interconnecting support on which the reference circuit unit is mounted.

There will be provided, therefore, as many adapters as there are types of circuit units to be tested.

Each interconnecting support is provided with a suitable number of contact pins and may be plugged into a corresponding socket mounted on the test panel and comprising as many plugs connected to the test circuit. In each support, the different pins are differently connected, either mutually, or with the terminal of the reference unit, in such a way, that, by plugging different supports on which different reference units are mounted into the same socket, the input terminals of the reference unit are always connected with the input terminals of the unit under test, and the output terminals of the reference unit are connected to suitable output plugs of the socket. It is thus possible, from the foregoing, that by plugging the pin support bearing the proper reference unit into the plug socket, all the suitable connections are established.

FIG. 6 shows in perspective and in a schematic way not to scale a possible arrangement of the testing device according to said embodiment.

The plug socket 45, provided with a suitable number of plugs 46, is mounted on the panel 40. It is assumed that the integrated circuit units to be tested are enclosed in a standard container of the type called "dual in line," that is, provided by terminal leads arranged in two rows on the major sides of the container, which has a rectangular elongated shape.

It is also assumed that there are 14 pin terminals, and that the logic test channels provided are four in number. The plug socket will then provide at least 22 plugs, of which 14 correspond to the 14 terminal leads of the integrated unit, and 8 are arranged in four pairs of plugs, each plug pair corresponding to the pair of inputs of the test channel. FIG. 6 indicates also the cover including the test channels. The signalling lamp 50 of the logic test circuit, protruding from the cover, the reset push button 51 and the lamp testing push button 52 operating either the contact 30 of FIG. 1 or the contact 86 of FIG. 1a, the signalling lamp 128 of the voltage testing circuit, the lamp testing push button 138 operating the contact 119 of FIG. 7 and the reset push button 132 operating the contact 130 (FIG. 7).

The socket 45 may receive the pin support 47 provided with pins 48 by plugging the two together. The pin support bears, fixedly mounted, the circuit reference unit 49 of the type corresponding to the circuit unit under test. A multiple flexible cable 41 is connected to the plug socket 45 and at its other end is connected the gripper 42 having contact springs 43 which may come in contact with the terminal leads 54 of the circuit unit under test which is mounted on the printed circuit board 56. After having carried out the test on a circuit unit of a first type, the gripper 42 is removed and applied to another circuit unit: if this is of a different type, the pin support must also be changed by plugging into the socket a support bearing a reference circuit unit of the new type.

Figure 7:
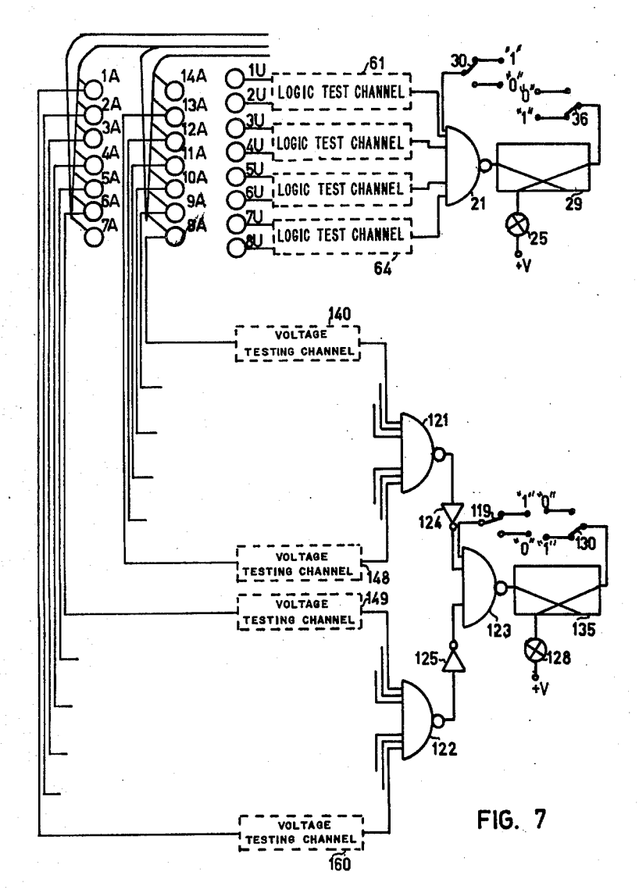
FIG. 7 is the complete block diagram of the device according to the invention, with the indication of the plug connections.

In the upper part of FIG. 7 the simplified circuit diagram of the logic test circuit, with the indication of the plug connections, is shown. The drawings show a possible arrangement, wherein the pins and the plugs are located in a manner suitable for an easy and clear description.

In practice, plug sockets and pin supports available on the market are used, in which the pins and plugs are uniformly arranged regardless of their function. In the described arrangement, it is assumed that there are two rows of plugs corresponding to the lead terminals of the circuit units. The plugs are numbered from 1A to 14A, and are connected to the flexible wire of the multiple cable for the connection to the contact springs 43 of the gripper 42. In the standard system considered, the lead terminals numbered 7 and 14 are always reserved respectively to the feeding voltage and to the ground connection. The feeding voltage and the ground connection of the logic testing circuit may be obtained through the gripper contacts which are pressed against said lead terminals.

There is, in addition, a row of eight plugs, numbered from 1U to 8U, each pair of them corresponding to a logic test channel.

The logic test channels are comprised in the rectangles enclosed by the dashed lines 61 to 64, and each one of these rectangles comprises the circuits that are enclosed in the rectangle enclosed by the dot-and-dash line, indicated by the reference numeral 20 in FIG. 1. These test channels may of course be implemented according to the alternative devices indicated in FIGS. 3, 3b, or 4.

The outputs of the four test channels are connected to a NAND gate 21, whose output controls the flip-flop 29, which is the same as the one indicated with the same reference numeral in FIG. 1. Also, the lamp testing contact 30, the reset contact 36, and the signalling device 25 are indicated by the same reference numerals in FIG. 7 as in FIG. 1.

The lower part of FIG. 7 schematically illustrates the device comprising the voltage testing channels, four of which are indicated by the reference numerals 140, 148, 149, 160. Each one comprises, for instance, the circuits which are contained in the rectangle 87 limited by the dashed line in FIG. 5.

In the example under consideration, where there are twelve possible input-output terminal leads, twelve voltage testing channels are needed. Particularly in the case where the voltage testing circuits are implemented by the use of differential amplifiers, as indicated in FIG. 5, it will be suitable to provide an independent stabilized voltage source not represented in the figure which may deliver the needed voltage for feeding these twelve voltage testing channels.

The output leads of the channels are connected to the inputs of two NAND gates indicated by numerals 121 and 122, having six inputs each. The output of these gates are connected to the inputs of the NAND gate 123 through two inverters indicated by numerals 124 and 125.

The output of the NAND gate 123 controls a signalling device which is the same as that represented in FIG. 5 and indicated by the same reference numeral.

Figure 8A:
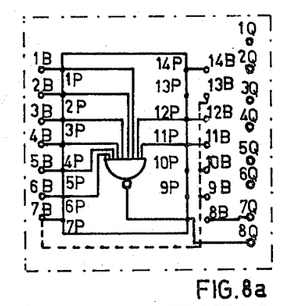
FIGS. 8a, 8b, 8c, 8d and 8e are five examples of the connections to be made on the pin support for different types of reference integrated units.
Figure 8B:
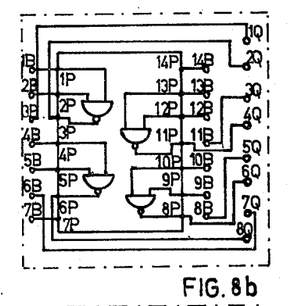
Figure 8C:
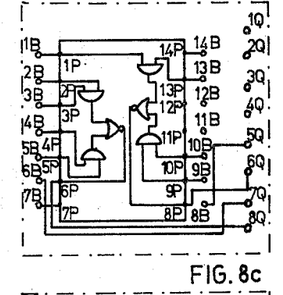

FIGS. 8a, 8b and 8c show the wiring diagrams of three types of circuit units mounted on their pin supports and the connections between the pins and the lead terminals and between the pins of the reference circuit unit. The terminal leads of the circuit units are numbered from 1P to 14 P as indicated.

The pin support has twenty-two pins corresponding to the twenty-two plugs of the socket and the pins provided for being plugged into the plugs 1A to 14A are numbered accordingly 1B to 14B while those provided for being plugged into the plugs 1U to 8U are numbered 1Q to 8Q.

FIG. 8a shows the wiring diagram of an integrated unit comprising a single NAND gate with eight inputs and a single output. The input leads 1P to 6P, 11P and 12P are connected to the corresponding pins 1B to 6B, 11B and 12B. The output lead 8P is connected to pin 8Q and the pin 8B is connected to pin 8Q. The feeding and grounding terminals 7P and 14P are connected to corresponding pins 7B and 14B. It may be seen that plugging the pin support of FIG. 8a into the plug socket of FIG. 7 sets up the connections needed for parallel connecting the eight input leads of the unit under test through the flexible cable and the coresponding plugs to the eight input leads of the reference unit.

The output lead of the unit under test through the flexible conductor connected to the plug 8A is connected to the output plug 7U by means of the strap between pins 8B and 7Q and the output lead of the reference unit through the pin 8Q is connected to the plug 8U. In this instance only the test channel 64 is used.

FIG. 8c shows the wiring diagram of another integrated unit comprising two AND-OR-NOT circuits, each one of them having four inputs and one output; there are therefore eight inputs and two outputs.

What has been said about the input leads in the case of FIG. 8a is valid also for this unit where the input leads are 1P, 2P, 3P, 4P, 5P, 9P, 10P and 13P. The output 8P is directly connected to the pin 6Q and the pin 8B is connected to the pin 5A. The second output lead 6P is directly connected to the pin 8Q and the pin 6Q to the pin 7Q. Thus, the two output leads of the reference unit are directly connected respectively to the plugs 6U and 8U, and the output leads of the unit under test are connected through the straps joining respectively the pins 8B and 5Q, and 6B and 7Q, to the plugs 5U and 7U. In this case the channels 63 and 64 of FIG. 7 are active.

In view of the aforesaid, it appears unnecessary to explain in detail the case of FIG. 8b, wherein the reference unit comprises four NAND gates with two inputs, and therefore has eight input leads and four output leads. In this case, all of the four test channels are used.

Figure 8D:
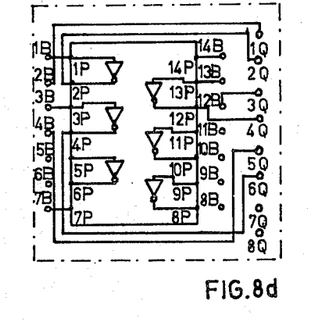
Figure 8E:
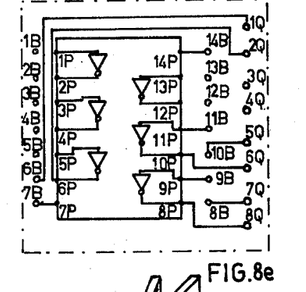

It may happen that some of the circuit units of the same standard system have output leads which out number the channels available on the test panel. The case of FIGS. 8d and 8e relates to a reference unit comprising six inverters and therefore having six inputs and six output leads. If the test panel is provided with only four test channels, two pin sockets may be used on which two equal reference units are mounted and for each unit only three inverters are connected to the input and output pins as shown by FIGS. 8d and 8e. In this case the testing of the unit under test must be made in two steps, the first time plugging the support of FIG. 8d into the socket and testing only the inverters connected to the input leads 1P, 3P and 13P and to the outputs 2P, 4P and 1P, and the second time plugging the unit of FIG. 8e into the socket, thus testing the remaining three inverters. In both cases three of the four available channels are used.

The changing of the connections of the inputs and outputs by strapping the various pin supports in a different manner is relevant only in respect of the logic testing channels, because, with regard to the voltage testing channels it is irrelevant whether the voltages on the different leads of the integrated unit are input or output voltages. However, the unused leads must not be left unconnected at fixed voltage levels, because, in this case, the conductors connected to them could assume by inductive or capacitative effects, even if temporarily, voltage levels of intermediate value between the maximum ZERO level and the minimum ONE level, thus causing a false error signal. Therefore, if the unit under test has unused terminal leads, it is convenient to connect, for instance, the corresponding inputs to the unemployed voltage test channels to ground. This is accomplished by connecting all the pins connected to unemployed terminal leads of the integrated unit under test to the ground pin on the pin support. For example, in FIG. 8a are indicated by dashed lines the connections to be made for grounding the unemployed pins in the case where the integrated unit under test is an eight-input NAND gate with a single output. In this integrated unit the terminal leads 9P, 10P and 13P are not used; and therefore the pins 9B, 10B and 13B, corresponding to as many unemployed voltage testing channels are connected to the ground pin 7B.

It must also be considered that the voltage testing circuits should not have an operating speed so high as to respond to the short transitory time intervals of switching between different voltage levels to avoid an error signal being given out in the very short time during which the switching from the ONE voltage level to the ZERO voltage level and vice versa takes place and the voltages of the input and output leads go through intermediate values.

The described embodiment, which provides separated logic testing channels for each pair of outputs, does not impose any restraint regarding the timing of the signal applied to the inputs of the different logic elements comprised in the same circuit unit under test.

However, in some instances the input signals causing the switching of the logic elements comprised in the same circuit unit are applied practically at the same time, or at least, the intervals between the instants of application of said signals are small in comparison with the duration of the spike pulses caused by the differences in the propagation times of the signals in the unit under test and in the reference unit. In this case, as the spikes are practically coincident, the logic test device may be simplified by using the more economical arrangement shown schematically in FIG. 9.

Figure 9:
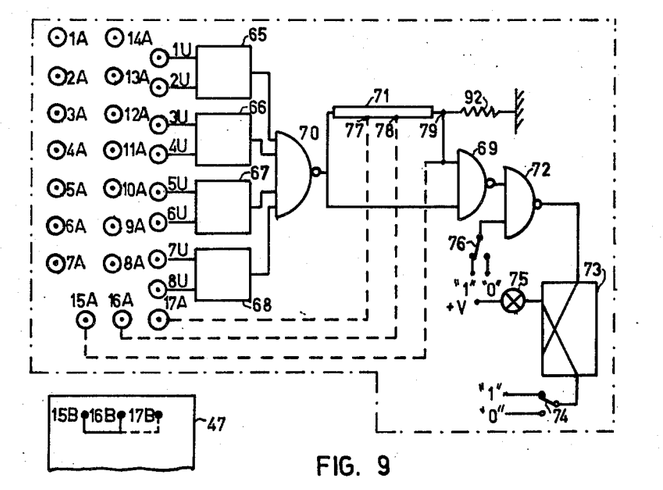
FIG. 9 is a simplified variant of the logical testing circuit according to the invention.

By this arrangment, each one of the four input pairs is associated to a comparator circuit (65, 66, 67, 68) and all of the outputs of said comparators are connected by a NAND gate 70 to a single delay line 71 closed on its characteristic impedance 92. The input and the output of the delay line 71 are connected to the two inputs of a NAND gate 69.

In this case, as the signals are inverted by the NAND gate 70, the spike pulses are pulses of level ONE, and therefore no inverter corresponding to the inverters 8 and 9 of FIG. 1 is needed. The output lead of the NAND gate 69 is connected to the input lead of a NAND gate 72 whose output controls the setting of the flip-flop 73 provided with a reset contact 74, and of a signalling device as the one shown in FIG. 1.

The second input of the NAND gate 72 is connected to the test contact 76, which may apply to it a ZERO level, thus setting the flip-flop as aforesaid.

In addition, the case may be considered where, in different integrated units, substantial diversity in the admissible differences between propagation times are allowed. For instance, in integrated circuit units of the type shown in FIGS. 8a to 8e, which comprise only very simple logic gates or circuits, the propagation delay may vary approximately from 2 to 12 nanoseconds and therefore the maximum length of the spikes which should be cancelled by the timing device is about 10 nanoseconds. In circuit units comprising more complex integrated circuits, propagation delays ranging from a minimum of 10 nanoseconds to a maximum of 55 nanoseconds may be allowed and therefore the maximum duration of the spike pulse is about 45 nanoseconds. In the integrating device which is designed for cancelling all spikes during up to 50 nanoseconds, it may happen that some defects in the logic gates which produce a nonadmissible increase of the propagation delay are not detected.

If the delay of the delay line must be adapted to the different durations of the spikes resulting from different types of integrated units, and if the generality of use for each type of integrated unit comprised in a same standard system must be maintained, the duration of the delay introduced by the delay line must be changed by changing the pin support bearing the reference unit. This is relatively simple to accomplish in the embodiment providing a single delay line for all testing circuits as represented in FIG. 9. In this case, the delay line 71 is provided with intermediate taps 77 and 78 in addition to the final terminal 79. These taps and the terminal are connected by the leads indicated by dashed lines to the additional plugs 15A, 16A and 17A, wherein the additional pins 15B, 16B and 17B are mounted on the pin support 47 which in FIG. 9 is represented only by the portion carrying such pins. By virtue of the fact that on this support suitable straps connect the pin 15B to the pin 16B, or to the pin 17B, or all three pins together, a different portion of the delay line is short circuited and therefore three different values of delay are obtained which may be suitable for three different types of integrated units.

The same arrangement may be employed, of course, in a similar way in the case where, instead of the delay line, the integrating circuit of FIG. 3 or the sampling circuit of FIG. 4 is employed. In these instances the additional pins of the pin support and the connecting straps will cause the connection or the disconnection of capacitors or resistors, series or parallel connected, in such a way as to change the time constant of the integrating circuits or of the circuit defining the operation time of the univibrator 96. These arrangements may be carried out in different ways all known to those skilled in the circuit art.

In the case of the arrangement of FIG. 7, providing as many logical testing circuits as are the possible outputs of the integrated circuit units, it is apparent that the described arrangement although technically possible, may encounter some difficulties due to the high number of additional pins and plugs to be provided for allowing the different connections of the intermediate taps on all delay lines comprised in the test device.

The test device according to the present invention may be easily applied in principle to any type of elementary complex circuit contained in a circuit unit. Even if in the above description reference is made to a container of the "dual in line" type, it is clear that the device may be used on any type of container, as for instance the containers known as "flat pack," "TO5" and others, by using grippers adapted to the different form of the container.

It is also apparent that in some cases the device may be used for testing modules comprising a plurality of integrated circuit units, as for instance, printed circuit cards.

If the circuit units to be tested contain devices which are not merely combinative but sequential in operation, that is, such that they may assume and maintain for a certain time a logic and electrical state which depends from the preceding logic and electrical state and from the applied signals, it will be necessary to provide that the circuit unit under test and the reference unit have all the sequential devices contained therein in the same pattern of states before the testing so that they may respond in the same manner to the signals applied to their inputs.

This may be accomplished according to the case by various means and procedures which are hereafter summarily described.

If the sequential circuit units to be tested are provided with a reset input, that is, have an input provided for putting all sequential devices in a predetermined electrical state, it will be possible in a general way to provide a push-button or key on the testing device for generating a reset signal to be applied at the reset inputs of both the unit under test and the reference unit.

After carrying out the connections between the unit under test and the testing device and before initiating the testing, it is thus possible to set both units in the same electrical state.

Alternatively, such reset signal may be automatically sent by the apparatus containing the units to be tested when the power is applied or by operating a "clear" push button if the apparatus is provided with these facilities as is very often the case. Thus, during the testing operations, it may be determined that the units under test and the reference unit have the same electrical state.

In other apparatus, the reset signal may be sent in subsequent stages of the working program or of the predisposed diagnostic program.

In this case, an inhibit circuit may be provided in the testing device to prevent the operation of the error indicating devices until the reset signal is effectively received. Such an inhibit circuit does not require a full and detailed description. It is sufficient to point out that as the reset signal is generally an impulsive signal, the inhibit circuit may comprise a memory element such as a flip-flop which assumes a predetermined state when the testing device is fed and sends out a permanent inhibiting signal. When this flip-flop receives a reset impulsive signal, it assumes the opposite state and removes the inhibiting signal.

An alternative set of solutions is offered by refraining from adding auxiliary circuits to the testing device and reaching the same results by the use of properly constructed programs.

The testing program may in fact be so arranged as to comprise a first stage during which some preliminary operations are accomplished including the resetting of the unit under test and of the reference unit. Error signals which could be generated in this stage will not be considered. At the end of the first stage, the testing program may be automatically stopped thus informing the operator (if no other proper means are available to effect this) that if the error signalling device is "on," it must be reset to "off." Thereafter, the second stage of the test program is started and in this stage any error signal is to be considered effective.

This solution is convenient in the instance where the sequential units to be tested are not provided with reset inputs. In this case the unit under test and the reference unit should be subjected to prearranged operation cycles which leave both units in the same electrical and logic state.

Figure 10:
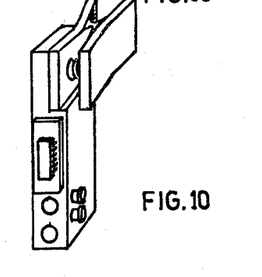
FIG. 10 is a schematic perspective illustration of another possible form of construction of the device.

It is obvious that many modifications may be made to the above described device by anyone skilled in the art without thereby departing from the spirit and scope of the invention. For example, if a particularly small and compact form of the device is desired, it may be constructed as shown schematically in FIG. 10 in the shape of a rectangular elongated container having at one end the gripper to be applied to the leads of the unit under test and on a lateral face the plug socket where the different pin supports carrying the reference unit may be plugged.

In addition, the switching of the connections needed for adapting the circuit to the different types of circuit units may be obtained in different ways. In a more complete embodiment which may be useful for testing the electronic apparatus in the factory or in a laboratory, all the types of reference units may be fixedly mounted on the testing device and be included in succession into the circuit by switching devices controlled by suitable push buttons.

What is claimed is:

1. A test device for testing minimal replaceable electronic circuit units which are normally mechanically mounted and electrically connected within an operating digital electronic system, said circuit units each having a plurality of input and output leads, said test device being operative without removing said circuit units from said system and while said system continues to supply system-generated input signals to said input leads of said circuit units, comprising: a reference circuit, extrinsic to said system and identical to the circuit under test; at least a comparator circuit having two inputs and one output; connector means for temporarily and singularly connecting said input lead terminal of said circuit unit under test to the corresponding input lead terminal of the reference circuit unit placing said input leads in parallel connection to receive said system-generated input signals from said digital electronic system and for connecting at least one output terminal of said circuit unit under test to a first input terminal of the comparator circuit; means for connecting the corresponding output terminal of the reference circuit unit to the second input terminal of said comparator circuit, in such a way, that a discordant signal of a predetermined binary level is present at the output of said comparator circuit whenever two signals of two different binary levels are present at the inputs of said comparator circuit; timing means for permitting the detection of said discordant signal only in case it exceeds a predetermined duration; means for memorizing said detected discordant signal; and alarm means controlled by said memorizing means.

2. The testing device of claim 1, wherein said timing means comprises a delay line.

3. The testing device of claim 1, wherein said timing means comprise a capacitor-resistor integrating circuit.

4. The testing device of claim 1, wherein said timing means comprise at least a monostable circuit.

5. The testing device of claim 1, wherein said conductor means comprises a gripping means provided with contact means for applying said contact means to said terminals with sufficient pressure.

6. The testing device of claim 1, comprising a plurality of test circuits, each one including a comparator circuit and a timing means, for simultaneously effecting the testing of a plurality of said minimal replaceable circuit units comprised in a common group of circuit units, and a memorizing means and alarm means common to all testing circuits.

7. A testing device as claimed in claim 1, comprising a plurality of comparator circuits for simultaneously effecting the comparison between binary levels of the outputs of a plurality of elementary circuits of the unit under test and corresponding outputs of the elementary circuit of the reference unit, and a timing means, a memorizing means and an alarm means, common to all said comparator circuits.

8. A testing device as in claim 1 comprising switching means for permitting the connection in sequence of different reference integrated circuit units, for testing integrated circuit units of different corresponding types.

9. A testing device as claimed in claim 8, whereby said switching means comprise a plug socket integral with said testing device, and a plurality of pin supports singularly pluggable into said plug socket, each pin support being integral to a reference circuit unit, suitable connections being made therein between the leads of said reference unit and the pins, and between the pins themselves, for effecting the required switching operation by plugging the pin support into the plug socket.

10. A testing device as claimed in claim 8, whereby said switching means is effective to suitably change the time characteristics of said timing means to adjust said time characteristics in reference to the possible duration of the discordant signal.

11. A testing device as in claim 1 comprising, in combination, a plurality of circuits for testing the voltage levels of the leads of the circuit unit under test, each one of said circuits for voltage testing comprising two threshold devices characterized by two different threshold voltage values, and a logic unit for giving out a determined binary level whenever the voltage applied to the input of said voltage testing circuit is comprised between said two threshold values.

12. The testing device of claim 11, wherein each one of said threshold device comprising a differential amplifier, at a first output of said differential amplifier being applied to the voltage present on a lead of the unit under test, at a second input of said differential amplifier being applied a threshold voltage of substantially constant value, a signal of a first, respectively, a second binary level being present at the output of said differential amplifier whenever the voltage applied to said first input is higher, respectively, lower than the voltage applied to said second input.

13. A test device for testing minimal replaceable electronic units, said electronic units being normally mechanically mounted and electrically connected within an operating digital electronic system each of said electronic units having a plurality of input and output leads, said test device being operative without removing said electronic unit from said system and while said system continues to supply system-generated input signals to said input leads of said units comprising: a reference circuit unit, extrinsic to said system, identical to the unit which is to be tested; at least one comparator circuit having two inputs and one output; a gripping means for temporarily and singularly connecting each input lead of a circuit unit under test to the corresponding input lead of the reference circuit placing said input leads in parallel connection to receive said input signals from said digital electronic system and for connecting at least one output of said circuit unit under test to a first input of the comparator circuit; means for connecting the corresponding output of the reference circuit unit to be second input of said comparator circuit, in such a way, that a discordant signal of a predetermined binary level is present at the output of said comparator circuit whenever two signals of two different binary levels are present at the inputs of said comparator circuit; timing means including a monostable circuit for detection of said discordant signal only when it exceeds a predetermined duration; means for memorizing said discordant signal and alarm means controlled by said memorizing means.

14. The testing device of claim 13, comprising a plurality of test circuits, each one including a comparator circuit and timing means, for simultaneously effecting the testing of a plurality of said minimal replaceable circuit units comprised in a common group of circuit units, and a memorizing means and alarm means common to all testing circuits.

15. A testing device as claimed in claim 13, comprising a plurality of comparator circuits for effecting at the same time the comparison between binary levels of the outputs of a plurality of elementary circuits of the unit under test and corresponding outputs of the elementary circuits of the reference unit, and a timing means, a memorizing means and an alarm means, common to all said comparator circuits.

16. A testing device as in claim 15 comprising switching means for permitting the connection in sequence of different reference integrated circuits units, for testing integrated circuit units of different corresponding types.

17. A testing device as claimed in claim 16, whereby said switching means is effective to suitably change the time characteristics of said timing means to adjust said time characteristics in reference to the possible duration of the discordant signal.

* * * * *

UNITED STATES PATENT OFFICE
CERTIFICATE OF CORRECTION

PATENT NO. : 3,882,386
DATED : May 6, 1975
INVENTOR(S) : Mario Vinsani

It is certified that error appears in the above-identified patent and that said Letters Patent are hereby corrected as shown below:

Column 16, line 13, delete "said" and substitute --each--.

Lines 38 & 39, delete "conductor" and substitute --connector--.

Column 17, line 31, after "system" insert a comma.

Line 36, after "units" insert a comma.

Column 18, line 6, delete "be" and substitute --the--.

Signed and Sealed this second Day of March 1976

[SEAL]

Attest:

RUTH C. MASON
Attesting Officer

C. MARSHALL DANN
Commissioner of Patents and Trademarks